US011007604B2

(12) United States Patent
Coeck

(10) Patent No.: US 11,007,604 B2
(45) Date of Patent: May 18, 2021

(54) SENSOR SYSTEM FOR DIRECTLY CALIBRATING HIGH POWER DENSITY LASERS USED IN DIRECT METAL LASER MELTING

(71) Applicant: 3D Systems, Inc., Rock Hill, SC (US)

(72) Inventor: Sam Coeck, Vertrijk (BE)

(73) Assignee: 3D Systems, Inc., Rock Hill, SC (US)

( * ) Notice: Subject to any disclaimer, the term of this patent is extended or adjusted under 35 U.S.C. 154(b) by 59 days.

(21) Appl. No.: 16/032,184

(22) Filed: Jul. 11, 2018

(65) Prior Publication Data
US 2019/0015933 A1    Jan. 17, 2019

Related U.S. Application Data

(60) Provisional application No. 62/531,384, filed on Jul. 12, 2017.

(51) Int. Cl.
*B23K 26/354* (2014.01)
*B23K 26/342* (2014.01)
(Continued)

(52) U.S. Cl.
CPC ............ *B23K 26/354* (2015.10); *B22F 12/00* (2021.01); *B23K 26/04* (2013.01); *B23K 26/064* (2015.10);
(Continued)

(58) Field of Classification Search
CPC .. B23K 26/354; B23K 26/064; B23K 26/342; B23K 26/705; B23K 26/04;
(Continued)

(56) References Cited

U.S. PATENT DOCUMENTS

| 6,646,728 | B1 | 11/2003 | Tang et al. | |
| 8,303,886 | B2 | 11/2012 | Philippi | |
| 2009/0179353 | A1* | 7/2009 | Philippi | ................. B33Y 10/00 264/400 |

FOREIGN PATENT DOCUMENTS

| DE | 4320408 | 12/1994 |
| DE | 19630607 | 10/1997 |

(Continued)

OTHER PUBLICATIONS

PCT International Search Report the International Searching Authority for PCT/US2018/041543, dated Oct. 4, 2018 (6 pages).
(Continued)

*Primary Examiner* — Phuong T Nguyen

(57) ABSTRACT

A three dimensional printing system includes a laser system, a beam splitter, a pinhole, a sensor, and a controller. The laser system emits a light beam of varying diameter carrying at least 100 watts of optical power along an optical path. The laser has an imaging plane along the optical path which can be coincident or close to a focal plane at which the beam has a minimum diameter. The beam splitter is positioned along the optical path to receive the beam and to transmit most of the optical power and to reflect remaining optical power. The pinhole is positioned along the optical path at the imaging plane to receive the reflected beam having a minimal diameter. The controller is configured to analyze a signal from the sensor to determine intensity and distribution parameters for the light beam.

19 Claims, 5 Drawing Sheets

(51) Int. Cl.
    *B22F 12/00*       (2021.01)
    *B23K 26/064*     (2014.01)
    *B23K 26/70*      (2014.01)
    *B23K 26/04*      (2014.01)
    *B23K 26/06*      (2014.01)
    *B23K 26/067*     (2006.01)
    *B22F 10/10*      (2021.01)
    *B33Y 30/00*      (2015.01)
    *B33Y 40/00*      (2020.01)
    *B33Y 50/02*      (2015.01)

(52) U.S. Cl.
    CPC ...... *B23K 26/0613* (2013.01); *B23K 26/0673* (2013.01); *B23K 26/342* (2015.10); *B23K 26/705* (2015.10); *B22F 10/10* (2021.01); *B33Y 30/00* (2014.12); *B33Y 40/00* (2014.12); *B33Y 50/02* (2014.12)

(58) Field of Classification Search
    CPC ............ B23K 26/0613; B23K 26/0673; B22F 3/1055; B22F 2003/1056; B22F 2003/1057; B33Y 30/00; B33Y 40/00; B33Y 50/02
    USPC ............ 219/121.73, 121.33, 121.36, 121.61, 219/121.64, 121.8, 121.84, 76.12, 76.14
    See application file for complete search history.

(56) References Cited

FOREIGN PATENT DOCUMENTS

| DE | 19630607 C1 | * 10/1997 | ........... B23K 26/702 |
|----|----|----|----|
| DE | 102007062129 | 6/2009 | |
| JP | H08174255 | 9/1996 | |

OTHER PUBLICATIONS

PCT Written Opinion of the International Searching Authority for PCT/US2018/041543, dated Oct. 4, 2018 (9 pages).

\* cited by examiner

SENSOR SYSTEM FOR DIRECTLY CALIBRATING HIGH POWER DENSITY LASERS USED IN DIRECT METAL LASER MELTING

CROSS-REFERENCE TO RELATED APPLICATIONS

This non-provisional patent application claims priority to U.S. Provisional Application Ser. No. 62/531,384, Entitled "SENSOR SYSTEM FOR DIRECTLY CALIBRATING HIGH POWER DENSITY LASERS USED IN DIRECT METAL LASER MELTING" by Sam Coeck, filed on Jul. 12, 2017, incorporated herein by reference under the benefit of U.S.C. 119(e).

FIELD OF THE INVENTION

The present disclosure relates to calibrating a laser system used for layer-by-layer additive manufacturing equipment. More particularly, the present disclosure describes a direct calibration of a high power density laser that is used in a direct metal laser melting process.

BACKGROUND

Three dimensional (3D) printers are in rapidly increasing use. One class of 3D printers includes direct metal laser melting printers that selectively melt and fuse metal powder in a layer-by-layer manner. These printers utilize metal powders such as stainless steel, aluminum, and titanium. The lasers required output a very high power density. Conventional methods and equipment for calibrating lasers are generally impractical because the laser beam will rapidly degrade most calibration equipment including the various optical components and sensors. There is a need for an accurate and durable system for calibrating such high power density lasers.

SUMMARY

In a first aspect of the disclosure, a three dimensional printing system includes a laser system, a beam splitter, a pinhole, a sensor, and a controller. The laser system emits a light beam of varying diameter carrying at least 100 watts of optical power along an optical path. The laser has a focal plane along the optical path at which the light beam has a minimum diameter. The beam splitter is positioned along the optical path to receive the beam and to transmit most of the optical power and to reflect remaining optical power. The pinhole is positioned along the optical path at an imaging plane to receive the reflected beam. The imaging plane can be coincident to or close to the focal plane. The controller is configured to analyze a signal from the sensor to determine intensity and distribution parameters for the light beam.

In one implementation the laser system includes a two dimensional scanning system that scans the beam along the pinhole along two axes that are perpendicular to the optical path. In another implementation the controller controls the laser system including the scanning system.

In yet another implementation the beam converges between the laser system and the beam splitter, the beam diameter at the beam splitter is at least three times the minimum beam diameter. In various other implementations the beam diameter at the beam splitter can be at least five times or at least ten times the minimum beam diameter.

In a further implementation the beam splitter reflects less than 25 percent of the optical power to the pinhole. In a yet further implementation the beam splitter reflects less than 20 percent of the optical power to the pinhole. In another implementation the beam splitter reflects about 5 to 20 percent of the optical power to the pinhole. In yet another implementation the beam splitter reflects about 10 percent of the optical power to the pinhole.

In a further implementation the minimum beam diameter is in a range of 35 to 300 microns. In a yet further implementation the minimum beam diameter is in a range of about 50 to 150 microns. In additional implementations the beam carries an output power of at least about 400 watts, at least about 500 watts, or about 1000 watts.

In another implementation the pinhole has a diameter of less than 25% of the minimum beam diameter.

In yet another implementation the beam diverges between the pinhole and the sensor, the beam diameter at the sensor is at least three times the minimum beam diameter. In various other implementations the beam diameter at the sensor can be at least five times or at least ten times the minimum beam diameter.

DETAILED DESCRIPTION OF THE PREFERRED EMBODIMENTS

Figure 1:
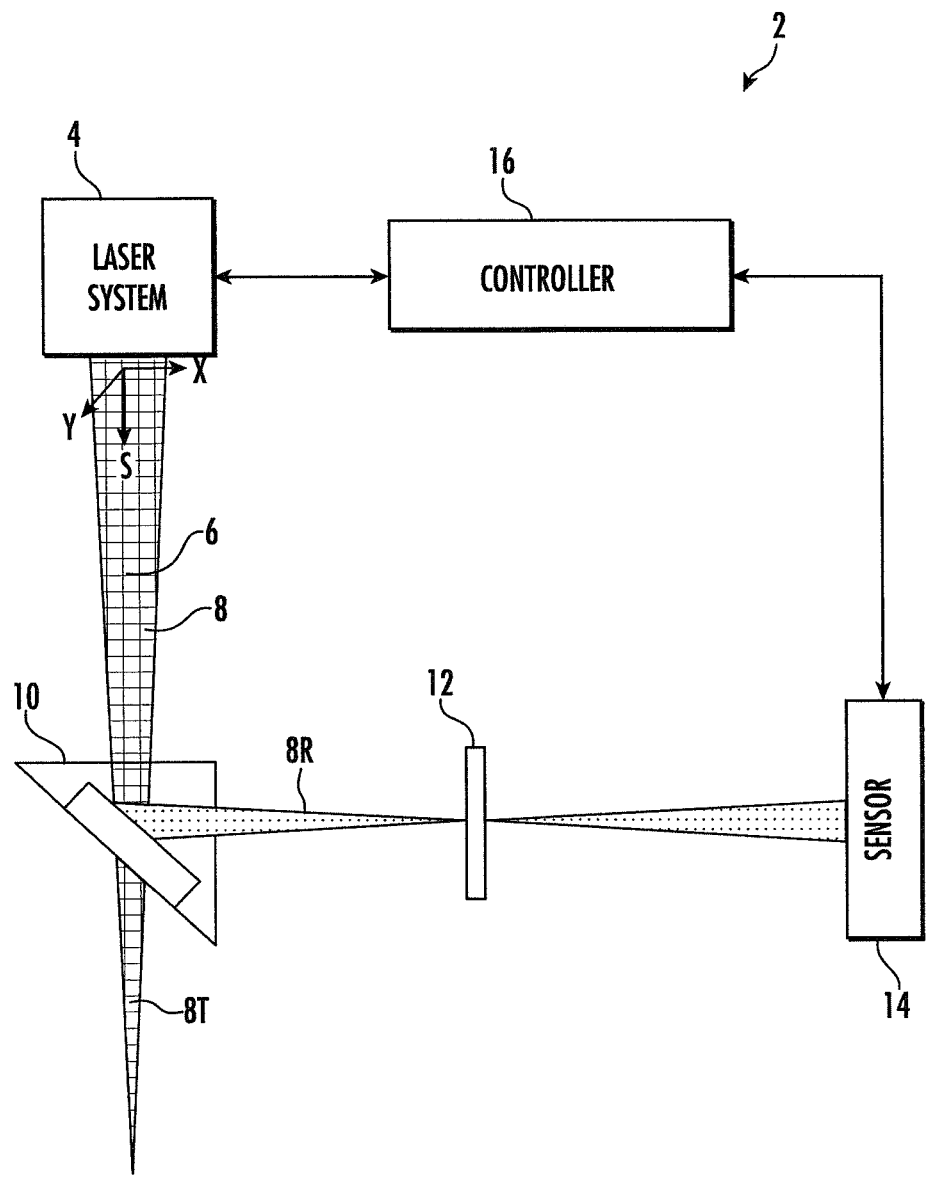
FIG. 1 is a block diagram schematic of a portion of a three dimensional printing system 2 with a laser calibration system.

FIG. 1 is a simplified (not to scale) block diagram schematic of a portion of a three dimensional (3D) printing system 2. In describing the three dimensional (3D) printing system 2, mutually perpendicular axes X, Y, and S are used to illustrate positions, directions, and motions. For purposes of the disclosure, the variable S is a distance from a laser 4 along an optical path 6 over which light beam 8 traverses. The vector direction S is the direction of light beam 8 and will tend to vary along the optical path 6. The axes X and Y are transverse to the optical path 6 and hence will also vary in direction along the optical path 6. Axes X and Y will be referred to as "transverse axes" and axis S as a "beam axis." The optical path 6 is defined by a number of optical components including laser system 4, beam splitter 10, pinhole 12, and sensor 14 between which the light beam 8 traverses. The light beam 8 varies in diameter (D) and converges and diverges along the optical path 6.

Laser system 4 includes a laser and a scanning system. Laser system 4 emits beam 8 that converges along the optical path 6 before reaching pinhole 12. Pinhole 12 is at an "imaging plane" of the laser system 4. The imaging plane is coincident with or close to a focal plane at which the beam diameter is minimized. At the focal plane, the minimum beam diameter ($D_{MIN}$) is in a range of 35 to 300 microns or 50-150 microns, or about 60 microns. The beam 8 carries an optical power of at least 100 watts. In some embodiments, the beam 8 can carry at least 400 watts or about 500 watts or about 1000 watts of optical power. In an exemplary embodiment, the three dimensional (3D) printing system 2 is utilized to selectively melt layers of metal powder such as stainless steel or titanium which requires such high power densities. The full power density of laser system 4 at a minimum beam diameter can degrade and damage optical components over time. The laser system 4 also controllably scans the beam 8 along the transverse axes X and Y.

When the beam 8 reaches beam splitter 10, it has a diameter D that is at least three times the minimum beam diameter $D_{MIN}$ to avoid degrading beam splitter 10. In other embodiments the beam diameter D at the beam splitter 10 is at least five times or at least ten times the minimum beam diameter $D_{MIN}$. Beam splitter 10 splits light beam 8 into a reflected portion 8R and a transmitted portion 8T. The reflected portion 8R of light beam 8 carries less than half of the optical power emitted from laser system 4. In more particular embodiments, the reflected portion carries less than 25%, less than 20%, or about 10% of the optical power emitted from laser system 4. In a particular embodiment the laser system emits 500 watts of optical power. The reflected portion 8R of the light beam 8 then carries 50 watts of optical power toward pinhole 12. The lower power level prevents degradation of pinhole 12 and damage to sensor 14.

Light beam 8 converges before pinhole 12 and diverges between pinhole 12 and sensor 14. Thus, light beam 8 has the minimum diameter $D_{MIN}$ at or near the pinhole 12 which is located at an imaging plane for the light beam 8. Pinhole 12 has a diameter that is less than 25% of the minimum diameter $D_{MIN}$ for light beam 8. In a more particular embodiment, the pinhole has a diameter that is 20% or less than the minimum diameter $D_{MIN}$ of light beam 8.

When light beam 8 (reflected portion 8R) reaches sensor 14, the beam diameter D is at least three times the minimum beam diameter $D_{MIN}$. In other embodiments the beam diameter D at the sensor 14 is at least five times or at least ten times the minimum beam diameter $D_{MIN}$. In one embodiment the optical path length between the beam splitter 10 and the pinhole 12 is about equal to the optical path length from the pinhole 12 to the sensor 14. In a more particular embodiment distance from beam splitter 10 to pinhole 12 is about 15 centimeters and the distance from pinhole 12 to sensor 14 is about 15 centimeters. The expansion of the beam from pinhole 12 to sensor 14 prevents damage to sensor 14. In an exemplary embodiment, sensor 14 is a photodiode.

Controller 16 is coupled to laser system 4 and sensor 14. Controller 16 controls laser system 4. Controller 16 receives information from sensor 14 during the scanning of light beam 8 and interprets this information to determine a beam shape profile and optical power level. Controller 16 includes a processor (not shown) and an information storage device (not shown). The information storage device stores instructions that, when executed on the processor, receive information from sensors, control portions of system 2, performs computations, and communicates results. This includes the method 20 as described with respect to FIG. 2. Controller 16 can be located on a single printed circuit board or substrate or it may be distributed upon multiple printed circuit boards and/or substrates. Controller 16 can be co-located at one location or it can be distributed among multiple spatial and/or geographic locations. In one embodiment controller 16 includes a controller for controlling the three dimensional printing system 2 and a separate controller for the purpose of calibrating the laser system 4.

Figure 2:
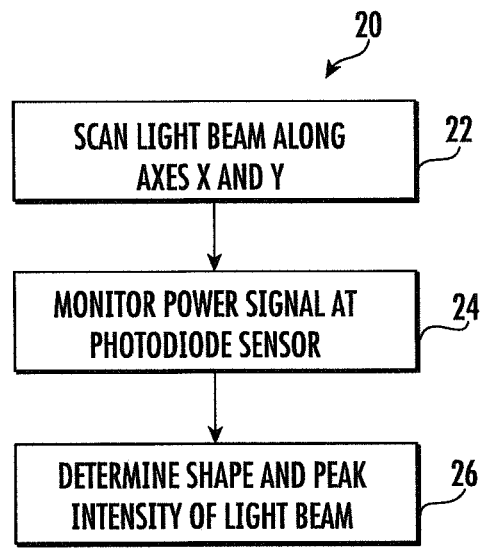
FIG. 2 is a flowchart depicting an exemplary operation of the three dimensional printing system 2 for analyzing a laser output.

FIG. 2 depicts a method 20 for analyzing laser system 4. The steps of method 20 are performed under the control of controller 16. According to step 22, the laser system 4 scans light beam 8 along the transverse axes X and Y. According to one embodiment, the pattern covers a box, circle, or oval, with a combination of incremental advancement along one axis and retracing along another axis.

According to step 24, a signal from sensor 14 is monitored. The signal is indicative of an optical power received by sensor 14 from reflected beam 8R. The power level varies due to the retracing and scanning pattern.

According to step 26, the power level versus time is analyzed. From this analysis, beam parameters including a beam shape and optical power level is determined for the light beam 8. Typically, the light beam 8 has a Gaussian distribution profile for intensity versus a radial distance from the optical axis S. The beam diameter can be defined by a cylindrical surface at which the intensity is reduced from the center of the beam by two standard deviations.

FIGS. 3-6 are for illustrating the method of FIG. 2. Before discussing these figures, the definition of some variables is reviewed. The variable D is defined as equal to the beam diameter at any point along the optical path 6. D varies with the distance S along the optical path 6 and decreases between the laser system 4 and the pinhole 12 and then increases between the pinhole 12 and the sensor 24. The variable $D_{MIN}$ is defined as the minimum beam diameter. Therefore $D=D_{MIN}$ at or near the pinhole 12. In defining D, we take the axis S to be at the center of the beam at which the beam intensity if greatest. For a typical circular beam, the intensity decreases with the square of the radial distance away from the axis S. The beam diameter D is defined as contained in two standard deviations away from S.

Figure 3:
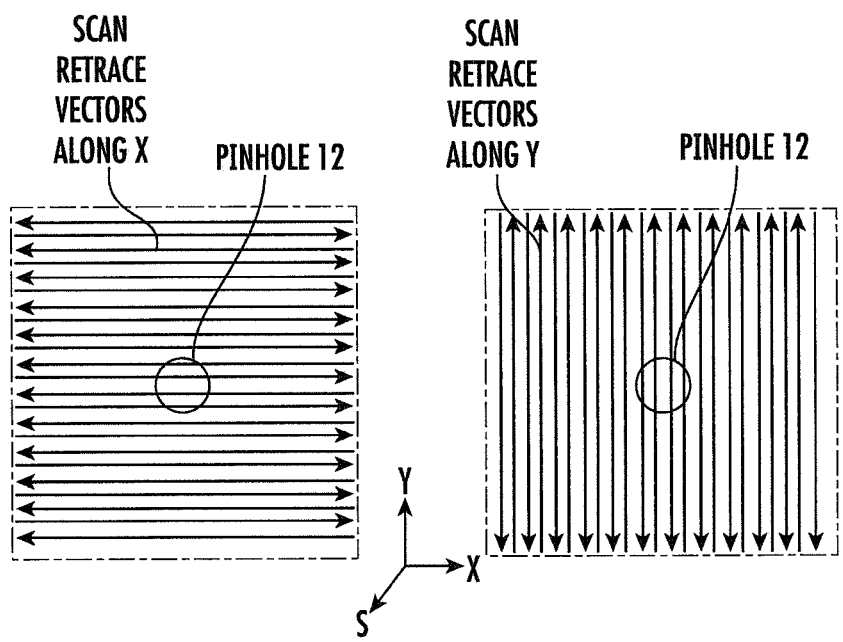
FIG. 3 is a diagram illustrating the scanning of a beam across a pinhole along transverse axes X and Y.

FIG. 3 is a much simplified (not to scale) diagram depicting the scanning of the light beam according to step 22 of FIG. 2. The beam can scan along X in a retrace pattern while incrementing along Y (left side of FIG. 3). Alternatively the beam scans along Y in a retrace pattern while incrementing along X (right side of FIG. 3). In some embodiments, such as the one illustrated with respect to FIG. 4, the scan direction has components along both X and Y.

Figure 4:
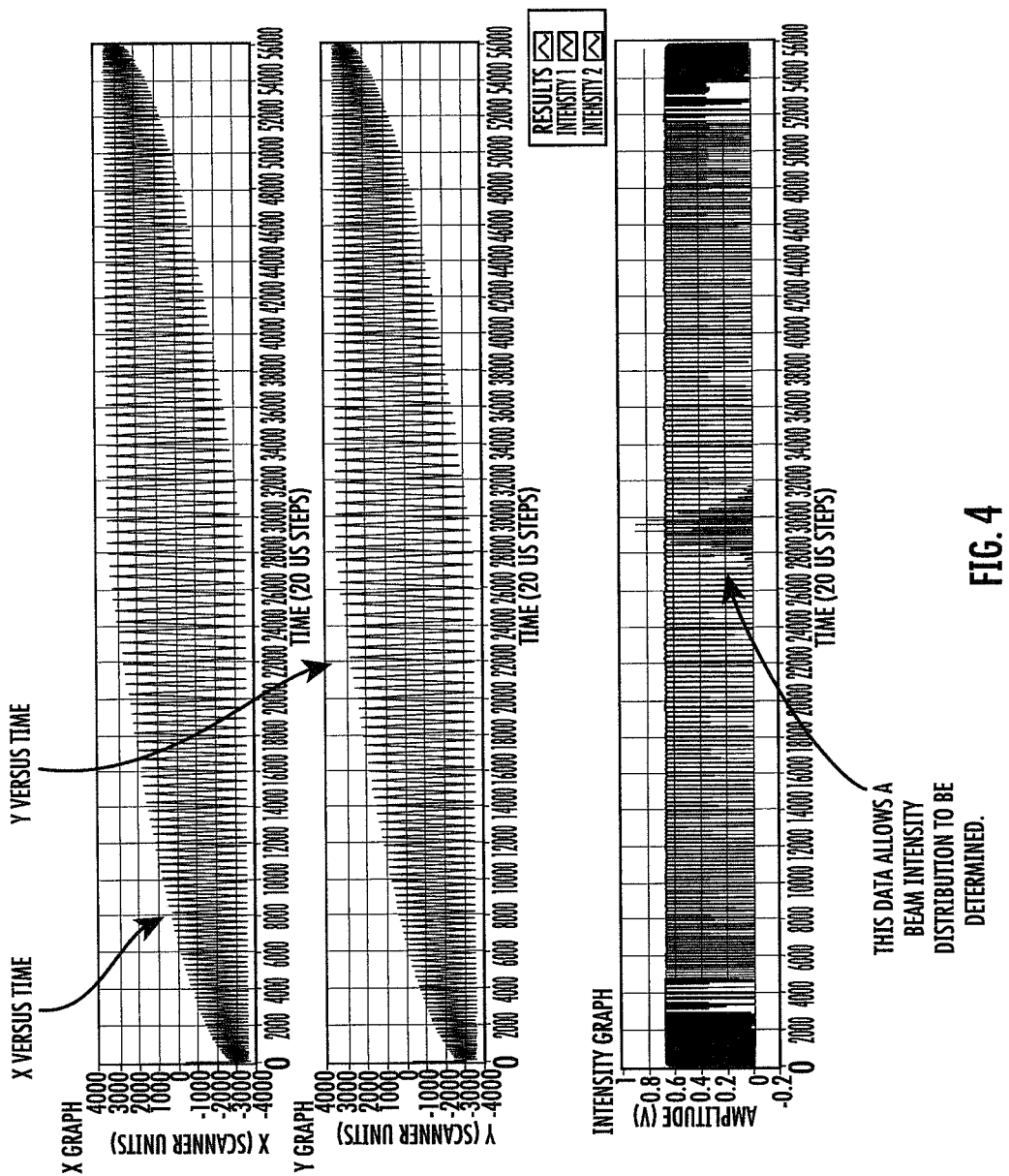
FIG. 4 shows scan signals for a beam scanning transversely across a pinhole.

The top and middle graphs of FIG. 4 illustrates the scanning and retrace pattern along a direction that is 45 degrees with respect to X. The top plot is X versus time and the middle plot is Y versus time. The bottom plot indicates measured intensity versus time including an indication of beam shape. This is further illustrated in FIG. 5.

Figure 5:
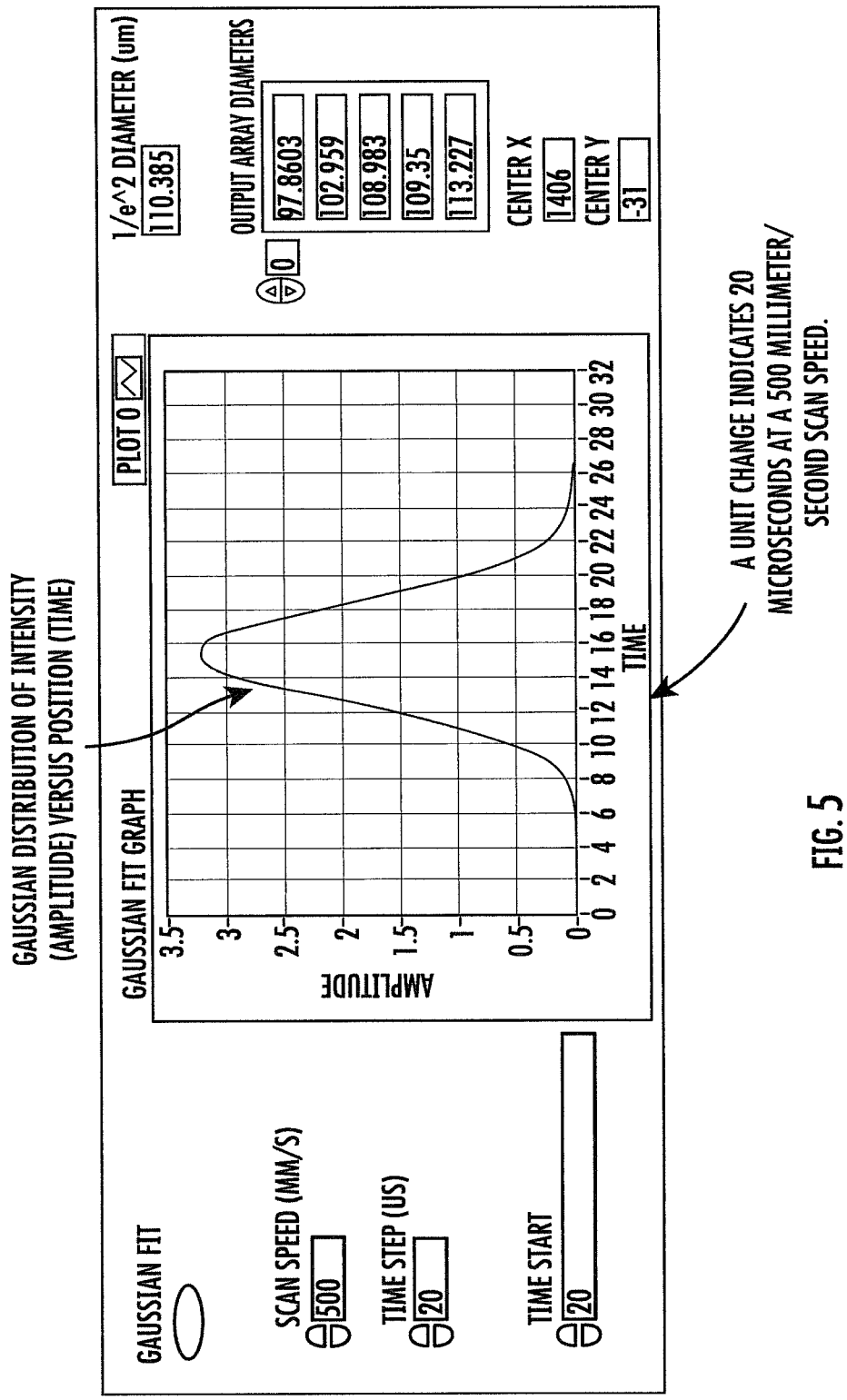
FIG. 5 depicts a profile plot of beam intensity versus a radial distance from an optical axis.

FIG. 5 depicts a plot of intensity level versus a radial position for the beam 8 along one axis. This plot is obtained along the X and Y axes. For a typical beam, the plot is symmetrical in X and Y which is indicative of a beam having a circular cross section. The center of the plot (peak value) corresponds to the optical axis S. The plot can be fitted to a Gaussian distribution from which a spatial value for sigma (one standard deviation) can be computed. Four times sigma is defined as the diameter D which equals $D_{MIN}$ at or near the pinhole 12.

Figure 6:
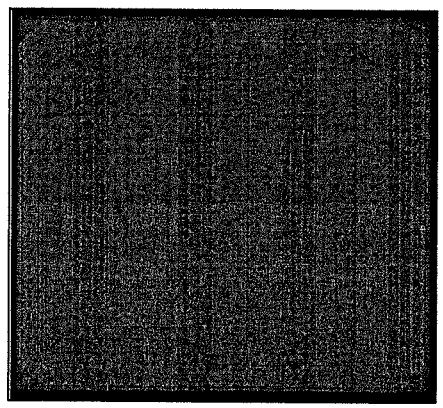
FIG. 6 illustrates a qualitative map of beam uniformity.

FIG. 6 depicts an image depicting a beam intensity versus position for a portion of the beam 8. This is a qualitative plot that enables a user of the printing system 2 to quickly obtain a qualitative understanding of beam uniformity.

The specific embodiments and applications thereof described above are for illustrative purposes only and do not preclude modifications and variations encompassed by the scope of the following claims.

What is claimed:

1. A three dimensional printing system compromising:
a laser system that emits a beam of varying diameter carrying at least 100 watts of optical power along an optical path, the laser having an imaging plane which is located at or near a focal plane at which the beam has a minimum beam diameter;
a beam splitter positioned along the optical path to receive the beam and to transmit most of the optical power and to reflect remaining optical power;
a pinhole positioned along the optical path at the imaging plane to receive the reflected beam;
a sensor positioned along the optical path to receive the beam from the pinhole; and
a controller configured to analyze a signal from the sensor to determine intensity and other parameters for the beam.

2. The three dimensional printing system of claim 1 wherein the laser system includes a two dimensional scanning system whereby the beam scans along the pinhole along two axes.

3. The three dimensional printing system of claim 2 wherein the controller controls the laser system including the scanning system.

4. The three dimensional printing system of claim 1 wherein the beam converges between the laser system and the beam splitter, the beam diameter at the beam splitter is at least five times the minimum beam diameter.

5. The three dimensional printing system of claim 1 wherein the beam splitter reflects less than 25 percent of the optical power of the beam to the pinhole.

6. The three dimensional printing system of claim 1 wherein the minimum beam diameter is in a range of about 35 and 300 microns.

7. The three dimensional printing system of claim 1 wherein the minimum beam diameter is in a range of about 50 to 150 microns.

8. The three dimensional printing system of claim 1 wherein the pinhole has a diameter of less than 25% of the minimum beam diameter.

9. The three dimensional printing system of claim 1 wherein the beam diverges between the pinhole and the sensor, the beam diameter at the sensor is at least five times the minimum beam diameter.

10. A laser calibration system for a high power density laser system comprising:
a series of optical components defining and positioned along an optical path to receive a converging and diverging beam emitted by the laser system, the laser system has an imaging plane and a focal plane along the optical path, the focal plane at which the beam has a minimum diameter, the series of optical components including:
a beam splitter receiving the converging beam at which the beam has a diameter of at least five times the minimum diameter, the beam splitter transmitting a majority of an incoming optical power of the beam and reflecting a minority of the incoming optical power;
a pinhole positioned at the imaging plane along the optical path to receive the reflected beam from the beam splitter;
a sensor receiving the diverging beam from the pinhole at which the beam has a diameter of at least five times the minimum diameter; and
a controller configured to analyze a signal from the sensor to determine intensity and distribution parameters for the laser.

11. The laser calibration system of claim 10 wherein the beam splitter reflects less than 25 percent of the optical power of the beam to the pinhole.

12. The laser calibration system of claim 10 wherein the minimum beam diameter is in a range of about 35 and 300 microns.

13. The laser calibration system of claim 10 wherein the pinhole has a diameter of less than 25% of the minimum beam diameter.

14. A three dimensional printing system comprising:
a laser that emits a light beam of at least 100 watts of optical power along an optical path, the laser has a focal position along the optical path at which the beam has a minimum diameter, the beam having converging and then diverging portions along the optical path;
a scanning system for scanning the laser in two dimensions perpendicular to the optical path;
a beam splitter positioned to receive the converging beam along the optical path at which the beam has a diameter of at least five times the minimum diameter, the beam splitter transmitting a majority of an incoming optical power of the beam and reflecting a minority of the incoming optical power;
a pinhole positioned an imaging plane along the optical path to receive the reflected beam from the beam splitter;
a sensor positioned to receive the diverging beam from the pinhole; and
a controller configured to analyze a signal from the sensor to determine intensity and distribution parameters for the laser.

15. The three dimensional printing system of claim 14 wherein the controller controls the laser and the scanning system.

16. The three dimensional printing system of claim 15 wherein the beam splitter reflects less than 25 percent of the optical power of the beam to the pinhole.

17. The three dimensional printing system of claim 15 wherein the minimum beam diameter is in a range of about 35 and 300 microns.

18. The three dimensional printing system of claim 15 wherein the minimum beam diameter is in a range of about 50 to 150 microns.

19. The three dimensional printing system of claim 15 wherein the pinhole has a diameter of less than 25% of the minimum beam diameter.

* * * * *